US006603624B1

(12) United States Patent
Takayama

(10) Patent No.: US 6,603,624 B1
(45) Date of Patent: Aug. 5, 2003

(54) TAPE DRIVE UNIT AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,858

(22) Filed: Dec. 10, 1999

(30) Foreign Application Priority Data

Dec. 11, 1998 (JP) .......................................... P10-353387

(51) Int. Cl.⁷ .............................................. G11B 19/02
(52) U.S. Cl. ...................................................... 360/69
(58) Field of Search ........................................... 360/69

(56) References Cited

U.S. PATENT DOCUMENTS 5,852,534 A * 12/1998 Ozue et al. .................... 360/69

* cited by examiner

Primary Examiner—David Hudspeth
Assistant Examiner—Mitchell Slavitt
(74) Attorney, Agent, or Firm—Jay H. Maioli

(57) ABSTRACT

A drive unit includes a tape driver for writing/reading information on/from a magnetic tape in the tape cassette including the magnetic tape and a memory for writing management information for managing writing on or reading from the magnetic tape when the tape cassette is loaded, a memory driver for writing/reading management information on/from the memory of the loaded tape cassette, and a controller in which when the tape driver executes an operation of writing or erasing information on the magnetic tape, or an operation of initializing the magnetic tape, the controller controls the memory driver to set flags in the management information of the memory to indicate that the operation is being executed, and in which, in accordance with completion of the operation, the controller controls the memory driver to reset the flags.

8 Claims, 18 Drawing Sheets

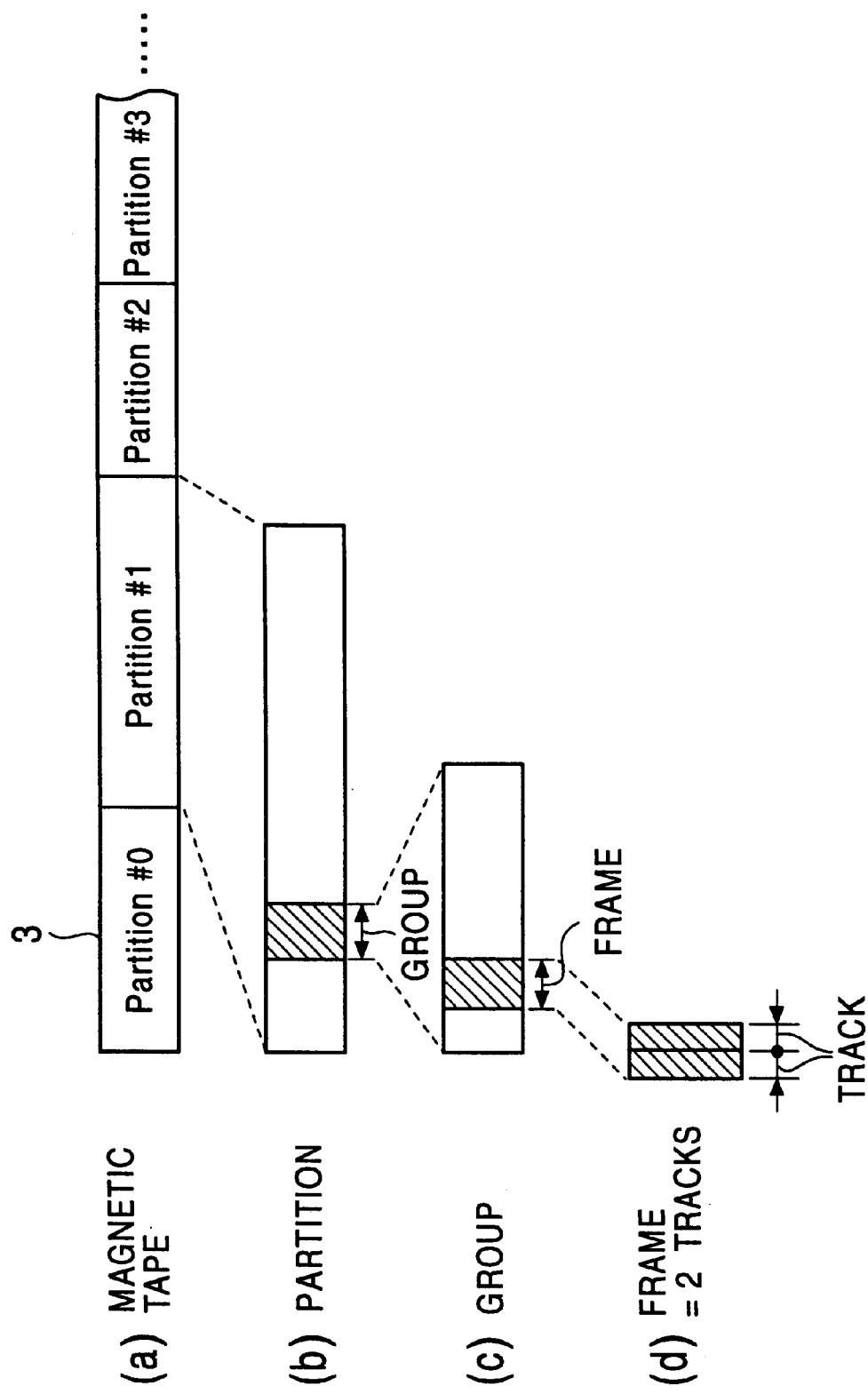

FIG. 11

| | | |
|---|---|---|
| | VOLUME INFORMATION CHECKSUM | 1 BYTE |
| | VOLUME INFORMATION | 100 BYTES |
| | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| VOLUME TAG (FL3) | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG. 13

| | | | |
|---|---|---|---|
| PREVIOUS GROUPS WRITTEN | | | 4 BYTES |
| TOTAL GROUPS WRITTEN | | | 4 BYTES |
| RESERVED | | | 1 BYTE |
| PREVIOUS GROUPS READ | | | 3 BYTES |
| TOTAL GROUPS READ | | | 4 BYTES |
| RESERVED | | | 1 BYTE |
| TOTAL REWRITTEN FRAMES | | | 3 BYTES |
| RESERVED | | | 1 BYTE |
| TOTAL 3RD ECC COUNT | | | 3 BYTES |
| ACCESS COUNT | | | 4 BYTES |
| UPDATE REPLACE COUNT | | | 4 BYTES |
| PREVIOUS REWRITTEN FRAMES | | | 2 BYTES |
| PREVIOUS 3RD ECC COUNT | | | 2 BYTES |
| RESERVED | | | 1 BYTE |
| LOAD COUNT | | | 3 BYTES |
| RESERVED | | | 1 BYTE |
| VALID MAXIMUM ABSOLUTE FRAME COUNT | | | 3 BYTES |
| FLAG BYTE | BIT 1 | PREVENT WRITE | 1 BYTE |
| | BIT 2 | PREVENT READ | |
| (PARTITION ATTRIBUTE FLAGS) | BIT 3 | PREVENT WRITE RETRz | |
| | BIT 4 | PREVENT READ RETRY | |
| | BIT 5 | RESERVED | |
| | BIT 6 | RESERVED | |
| | BIT 7 | RESERVED | |
| | BIT 8 | PARTITION OPEN CLOSE FLAG | |
| MAXIMUM ABSOLUTE FRAME COUNT | | | 3 BYTES |

48 BYTES

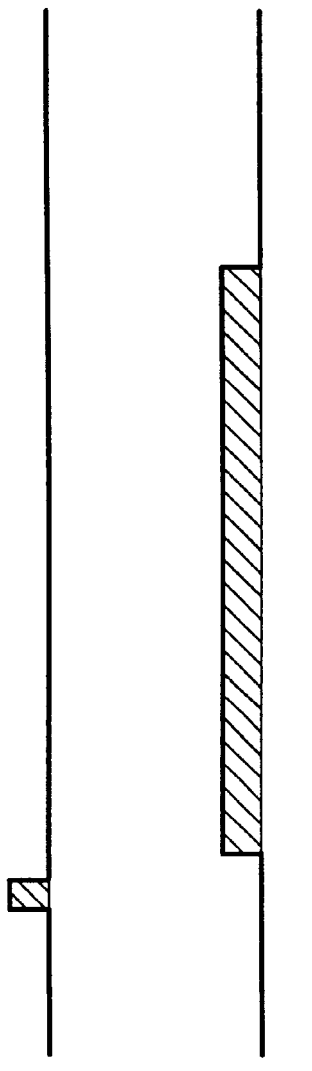
FIG. 14A WRITE COMMAND
FIG. 14B WRITING DATA
FIG. 14C WRITING OPERATION
FIG. 14D FLAG

TAPE DRIVE UNIT AND RECORDING MEDIUM

BACKGROUND OF THE INVENTION

1. Field of the Invention

The present invention relates to a tape drive unit and to a recording medium.

2. Description of the Related Art

A so-called "tape streaming drive" is known as a drive unit for writing/reading digital data on/from a magnetic tape. This tape streaming drive can have a large recording capacity of, for example, approximately several dozen to several hundred gigabytes, although the capacity varies according to the length of the tape (as a medium) in the tape cassette. Accordingly, the tape streaming drive has various uses, such as a backup of data recorded on a medium such as a hard disk for a computer. The tape streaming drive is suitable for storing image data, which is typically large.

As the above-described tape streaming drive, one that performs data writing/reading by employing a helical scan system using a rotary head and using, for example, an 8-mm videocassette-recorder (VCR) tape cassette as a recording medium, has been proposed.

A tape streaming drive using an 8-mm VCR tape cassette, as described above, uses, for example, a small computer system interface (SCSI) as an input/output interface for data to be written/read.

In the writing mode, data supplied from, for example, a host computer, are input via the SCSI interface. Predetermined compression and encoding processes on the input data are performed and the processed data are recorded on a magnetic tape in a tape cassette.

In the reading mode, the data on the magnetic tape are read and decoded. The decoded data are transmitted to the host computer via the SCSI interface.

In a data storage system composed of the above-described tape streaming drive and tape cassette, when a power cut, etc., occurs due to a blackout or the like while a writing operation to a magnetic tape in the tape cassette (a partition in the case where a plurality of partitions are provided on the magnetic tape) is being performed, the writing operation is incomplete and interrupted. Also, while data erasure or magnetic tape initialization is being performed, the operation is similarly incomplete and interrupted. With respect to FIG. 19, incomplete operations are described. By way of example, a writing operation is considered in which from a point at which data DT (old) is recorded in a partition #m on a magnetic tape (condition (a)), new data DT (new) is written in the partition #m (i.e., data updating).

In this case, writing for data updating is performed as indicated by the arrow Rec (condition (b)). When the operation is interrupted at a point by a power cut, new data DT (new) is half recorded on the magnetic tape (condition (c)), and old data DT (old) remains.

When a tape cassette in which a magnetic tape having condition (c) is loaded into a tape streaming drive, the tape streaming drive reads a mixture of old and new data if the drive is unable to recognize that condition, and the reliability of the storage system greatly deteriorates.

Data writing is performed in units called "groups GPs" (conditions (d) and (e)). When it is assumed that the groups are used as so-called "error-correcting units", if a power cut occurs in the middle of a group GP, that is, when old and new data are mixed in a group GP (condition (e)), appropriate error correction is impossible when reading is performed, so that the tape streaming drive may detect a malfunction.

However, in the case where a power cut occurs at a separating point between two groups GPS, that is, when there is no group GP having a mixture of old and new data (condition (d)), correct error corrections are obtained for all the groups, and the malfunction cannot be detected. In such a case, inappropriate data having a mixture of old and new data is read and sent to a host computer.

In the case where an accidental power cut causes the condition of the data on the magnetic tape to be inappropriate, as described above, there is a problem in that if failing to detect a malfunction, the tape streaming drive subsequently performs wrong data processing, and the system lacks reliability.

SUMMARY OF THE INVENTION

Accordingly, it is an object of the present invention to provide a tape drive unit and a tape cassette in which inappropriate operations are prevented by detecting, on a magnetic tape, error caused by a power cut.

To this end, according to an aspect of the present invention, the foregoing object is achieved though provision of a tape drive unit adapted for a tape cassette including a magnetic tape and a memory for writing management information for managing writing on or reading from the magnetic tape. The tape drive unit includes a tape driver for writing/reading information on/from the magnetic tape of the tape cassette when the tape cassette is loaded, a memory driver for writing/reading management information on/from the memory of the loaded tape cassette, and a controller in which when the tape driver executes an operation of writing or erasing information on the magnetic tape, or an operation of initializing the magnetic tape, the controller controls the memory driver to set flags in the management information of the memory to indicate that the operation is being executed, and in which, in accordance with completion of the operation, the controller controls the memory driver to reset the flags.

Preferably, the flags include a first flag, and the controller controls the setting or resetting of the first flag.

The flags may include a second flag for managing each partition on the magnetic tape of the tape cassette, and the controller may control the setting or resetting the second flag in accordance with a partition in which the operation is executed.

When the flags are set for the magnetic tape or a partition on the magnetic tape on which the information writing operation is executed, the controller may inhibit the information writing operation from being executed.

When the flags are set for the magnetic tape or a partition on the magnetic tape on which the information writing operation is executed, the controller may notify a host unit of an error.

According to another aspect of the present invention, the foregoing object is achieved through provision of a recording medium including a magnetic tape and a memory for writing management information for managing writing to or reading from the magnetic tape. The management information of the memory includes a region in which when the tape drive unit executes operation of writing/erasing information on the magnetic tape, or initializing operation, a flag indicating that the operation is being executed is set in the region.

Preferably, the flag is management information for managing the overall magnetic tape.

The flag may be management information for managing each partition on the magnetic tape.

BRIEF DESCRIPTION OF THE DRAWINGS

FIG. 4 is a drawing showing the structure of data on a magnetic tape in the tape cassette shown in FIG. 2;

FIG. 11 is an illustration of a volume tag in the MIC shown in FIG. 7;

FIG. 13 is an illustration of partition information the MIC shown in FIG. 7;

FIGS. 14A, 14B, 14C, and 14D are illustrations of flag condition in the period of a writing operation by the tape streaming drive shown in FIG. 1;

DESCRIPTION OF THE PREFERRED EMBODIMENTS

Embodiments of the present invention are described below. These embodiments are a tape cassette including a nonvolatile memory, and a tape drive unit (tape streaming drive) which is adapted for the memory-included tape cassette and which is capable of writing/reading digital data.

The nonvolatile memory included in the tape cassette is called a "memory-in-cassette (MIC)".

The description is given in the following order:
1. Structure of Tape Cassette;
2. Structure of Tape streaming drive;
3. Structure of Data on Magnetic Tape;
4. Structure of Data in MIC; and
5. Processing in Operations such as Writing.

1. Structure of Tape Cassette

Figure 2:
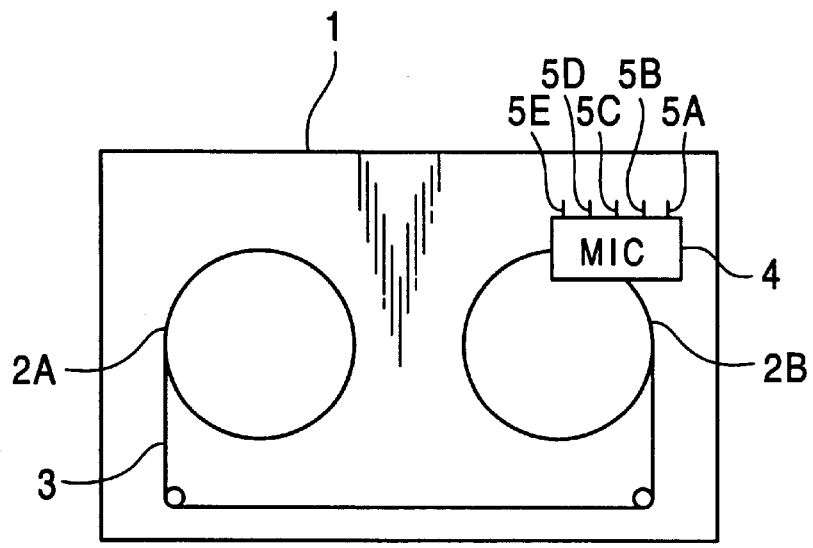
FIG. 2 is a drawing showing the internal structure of a tape cassette according to an embodiment of the present invention.
Figure 3:
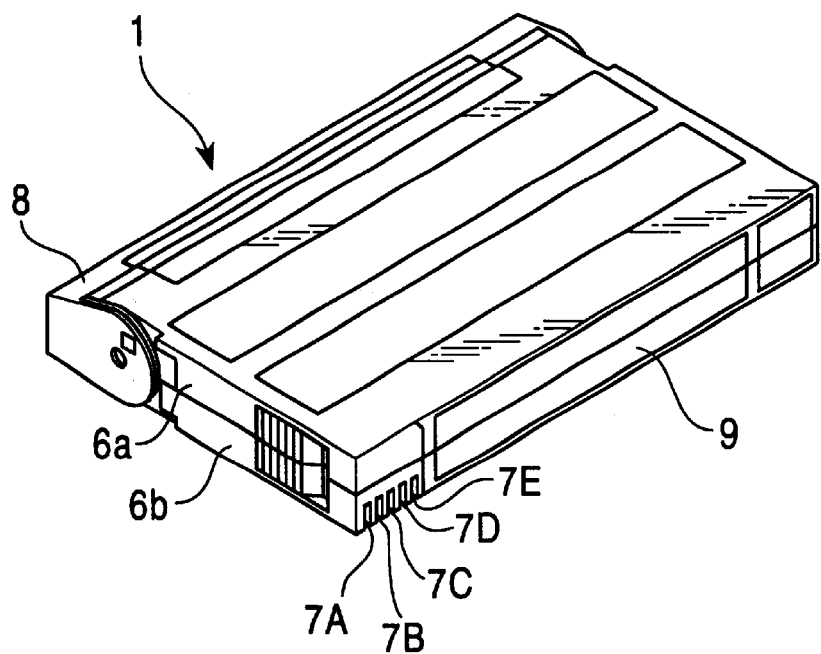
FIG. 3 is a perspective view showing the exterior of the tape cassette shown in FIG. 2.

With reference to FIGS. 2 and 3, an MIC-included tape cassette adapted for a tape streaming drive 10 (described below) according to this embodiment is described below.

FIG. 2 conceptually shows a tape cassette internal structure. In the tape cassette 1 shown in this Figure, reel hubs 2A and 2B are provided, and a magnetic tape 3 having a tape width of 8 mm is provided between both reel hubs 2A and 2B.

The tape cassette 1 is provided with an MIC as a nonvolatile memory. From the MIC as a module, five terminals 5A, 5B, 5C, 5D, and 5E are extended from the MIC as a module, and they are respectively formed as a power supply terminal, a data input terminal, a clock input terminal, a ground terminal, and an auxiliary terminal. The MIC 4 stores the manufacturing date and manufacturing place of each tape cassette, tape width and length, material, information related to the use record, etc., of recorded data for each partition formed on the tape 3, user information, etc., which are described below. In this specification, various types of information stored in the MIC 4 are also called "management information".

FIG. 3 shows an exterior view of the tape cassette 1. Its entire housing includes an upper case 6a, a lower case 6b, and a guard panel 8, and is basically similar to the structure of a tape cassette for use in an ordinary 8-mm VCR. On a label surface 9 on a side of the tape cassette 1, terminal pins 7A, 7B, 7C, 7D, and 7E are provided and are connected to the terminals 5A, 5B, 5C, 5D, and 5E described using FIG. 2. In other words, in this embodiment, when the tape cassette 1 is in physical contact with a tape streaming drive 10, which is described next, data signals, etc., are mutually transmitted via the terminal pins 7A, 7B, 7C, 7D, and 7E.

2. Structure of Tape Streaming Drive

Figure 1:
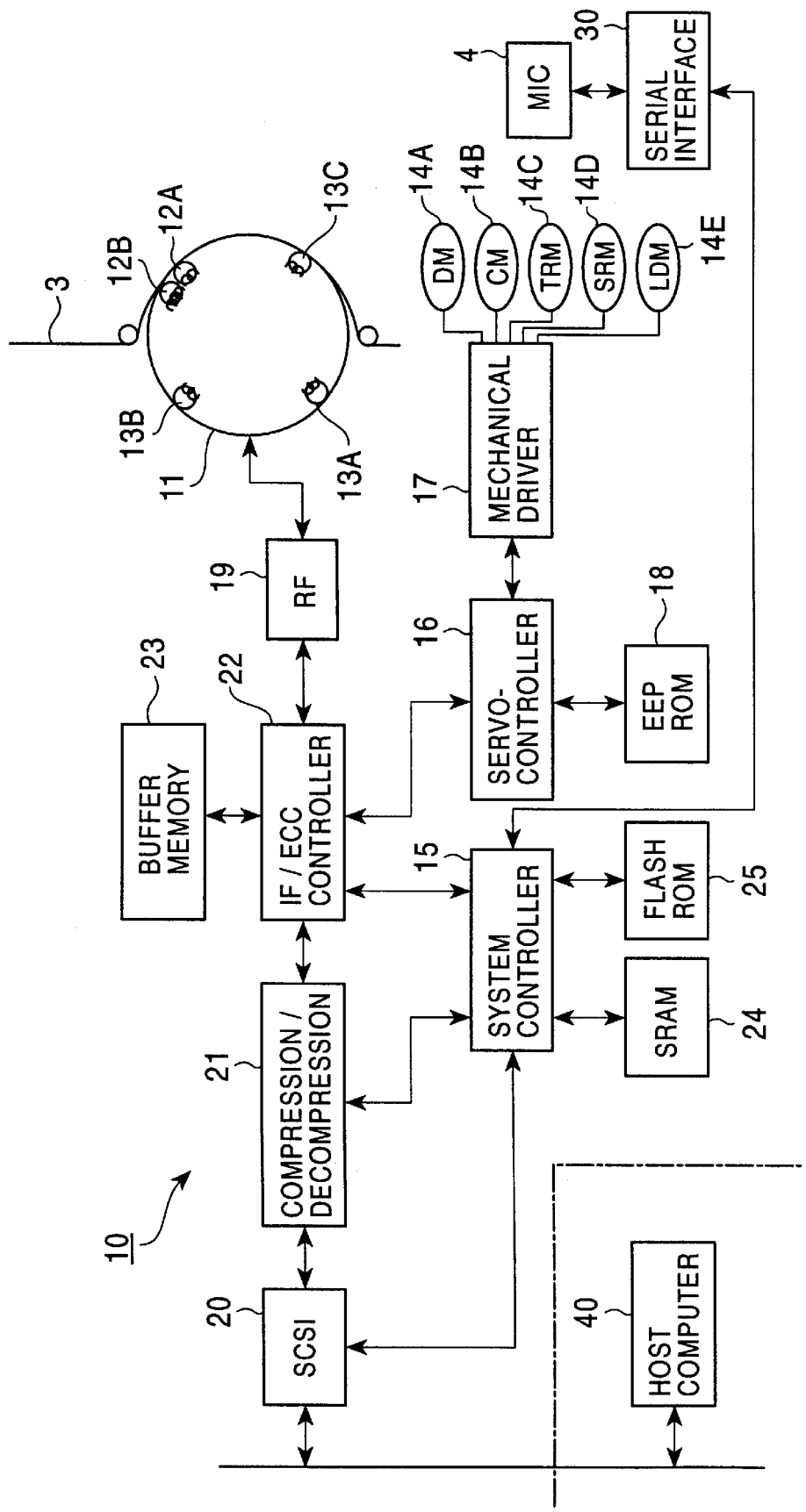
FIG. 1 is a block diagram of a tape streaming drive according to an embodiment of the present invention.

With reference to FIG. 1, the structure of the tape streaming drive 10 according to this embodiment is described. In the tape streaming drive 10, a helical scanning method is used to perform writing/reading on/from the magnetic tape 3 of the tape cassette 1 when it is loaded.

In the rotary drum 11, two write heads 12A and 12B having different azimuth angles, and three read heads 13A, 13B, and 13C having required azimuth angles, are provided at predetermined intervals of angle.

The rotary drum 11, around which the magnetic tape 3 pulled from the tape cassette 1 is wound, is rotated by a drum motor 14A.

A capstan for running the magnetic tape 3 at constant speed, which is not shown, is driven to rotate by a capstan motor 14B.

The reel hubs 2A and 2B in the tape cassette 1 are separately driven to rotate in a forward direction and a reverse direction by reel motors 14C and 14D.

A loading motor 14E drives a loading mechanism, which is not shown, and executes the loading/unloading of the magnetic tape 3 onto the rotary drum 11.

The drum motor 14A, the capstan motor 14B, the reel motors 14C and 14D, and the loading motor 14E are driven to rotate by electric power application from a mechanical driver 17. Based on control from a servo controller 16, the mechanical driver 17 drives each motor. The servo controller 16 performs control of the rotational speed of each motor, thereby executing running in the normal writing/reading mode and tape running in the high speed reading mode, tape running in fast forwarding and rewinding modes, a tape cassette loading operation, a loading/unloading operation, a tape tension control operation, etc.

Each of the drum motor 14A, the capstan motor 14B, and the reel motors 14C and 14D is provided with a frequency generator (FG), which is not shown, so that the servo controller 16 executes servo control of each motor, whereby the rotation information of each motor can be detected.

The servo controller 16 detects an error from the target rotational speed on the rotational operation of each motor by recognizing based on FG pulses the rotational speed of each motor, and control of power application, which corresponds to the amount of the error, to the mechanical driver 17, thereby realizing rotational speed control by a closed loop. Therefore, in the various operation modes such as normal running in writing/reading, high speed searching, fast forwarding, and rewinding, the servo controller 16 uses the target rotational speed adapted for each operation mode to control each motor to rotate.

In an EEP-ROM 18, constants, etc., for servo control of each motor by the servo controller 16 are stored.

The servo controller 16 is bidirectionally connected to a system controller 15 for executing processing for controlling the entire system via an interface controller/ECC formatter 22 (hereinafter referred to as an "IF controller/ECC formatter").

The tape streaming drive 10 uses an SCSI interface 20 for data input and output. For example, in the data writing mode, from a host computer 40, sequential data are input in transmission data units called "fixed-length records" via the SCSI interface 20, and are supplied to a compression/decompression circuit 21. This type of tape streaming drive system also has a mode in which data are transmitted in collective units of variable-length data by the host computer 40.

The compression/decompression circuit 21 uses a predetermined method to perform compression processing on input data, if required. In the case where a type of compressing method using, for example, LZ codes is employed, a dedicated code is assigned to each previously processed character string, and is stored in the form of a dictionary. A character string input subsequently is compared with the contents of the dictionary, and when the character string of the input data matches a code of the dictionary, the code of the dictionary is replaced by the character string data. The data of an input character string having not matched the dictionary is sequentially supplied with a new code, and is recorded in the dictionary. By registering the data of input character strings, and replacing codes of a dictionary by the character string data, data compression is performed.

An output from the compression/decompression circuit 21 is supplied to the IF/ECC controller 22, and the IF/ECC controller 22 temporarily stores the output from the IF/ECC controller 22 in a buffer memory 22 by performing its control operation. Under the control of the IF/ECC controller 22, the data stored in the buffer memory 23 are finally processed as data in fixed-length units each corresponding to 40 magnetic tape tracks called a "group", and the data are processed by ECC format processing.

In the ECC format processing, error-correcting codes are added to write data, and the data are modulated so as to be adapted for magnetic writing before being supplied to an RF processor 19.

The RF processor 19 generates recording signals by processing the supplied write data, such as amplification and writing equalizing, and supplies them to the write heads 12A and 12B. This performs data writing on the magnetic tape 3 from the write heads 12A and 12B.

Briefly referring to the operation of data reading, the write data on the magnetic tape 3 are read as an RF read signal by the read heads 13A and 13B, and the RF processor 19 performs processing on the reproduced signal, such as reading equalizing, reading clock generating, binarization and decoding (e.g., Viterbi decoding).

The signal read as described above is supplied to the IF/ECC controller 22, and is initially error-corrected. The corrected signal is temporarily stored in the buffer memory 23, and it is read at a predetermined point of time and supplied to the-compression/decompression circuit 21.

Based on determination by the system controller 15, the compression/decompression circuit 21 performs data decompression when the data compressed by the compression/decompression circuit 21 in the writing mode are supplied, while the compression/decompression circuit 21 outputs the supplied data by allowing the supplied data to pass through it when the supplied data are non-compressed data.

The output data from the compression/decompression circuit 21 are output as reproduced data to the host computer 40 via the SCSI interface.

In addition, in FIG. 1, the MIC 4 is shown, together with the magnetic tape 3 of the tape cassette 1. When the tape cassette itself is loaded into the tape streaming drive, the MIC 4 is connected to the system controller 15 via a serial interface 30 as the terminal pin input/output stage shown in FIG. 3 so that data communication can be performed. Thereby, the system controller 15 can read the management information recorded in the MIC 4 and can update the management information.

Between the MIC 4 and the host computer 40, mutual transmission of data is performed using SCSI commands. Accordingly, it is not necessary, in particular, to provide a dedicated line between the MIC 4 and the host computer 40. As a result, data exchange between the tape cassette and the host computer 40 can be established by using only the SCSI interface.

Although the SCSI interface 20 is used to perform mutual transmission of information between the tape streaming drive 10 and the host computer 40, as described above, the host computer 40 uses SCSI commands to perform various types of communication with the system controller 15.

Therefore, by using SCSI commands, the host computer 40 can instruct the system controller 15 to execute data writing/reading in/from the MIC 4.

In a static random access memory (S-RAM) 24 and a flash ROM 25, data for various processes by the system controller 15 are stored.

By way of example, constants, etc., for control, are stored in the flash ROM 25. In addition, the S-RAM 24 is used as a work memory or a memory for storing the data read from the MIC 4, data to be written in the MIC 4, mode data in units of tape cassettes, various types of flag data, etc., and for arithmetic processing.

The S-RAM 24 and the flash ROM 25 may be provided as internal memories of a microcomputer included in the system controller 15, or may be provided by using part of the areas of the buffer memory 23 as a work memory.

3. Structure of Data on Magnetic Tape

Next, the format of data on the magnetic tape 3 of the tape cassette 1 to which or from which writing or reading is performed by the above-described tape streaming drive 10 is described below.

FIG. 4 shows the structure of data recorded on the magnetic tape 3. Illustration (a) schematically shows one magnetic tape 3.

In this embodiment, the one magnetic tape 3 can be used in the form that it is divided in units of (a) partitions, and a maximum of 256 partitions can be set and managed in the system according to this embodiment. The partitions shown in FIG. 4 are supplied with partition numbers as indicated by partitions #0, #1, #2, #3, and so forth.

Therefore, in this embodiment, data writing/reading, etc., can be separately performed for each partition. For example, the data writing unit in (b) one partition can be divided into fixed-length units which are each called (c) a "group", and writing on the magnetic tape 3 is performed in each group unit.

In this case, one group corresponds to the data amount of 20 frames, and (d) one frame is formed by two tracks. In this case, the two tracks forming one frame are used as adjacent positive-azimuth and negative-azimuth tracks. Accordingly, one group is formed by 40 tracks.

Figure 5A:
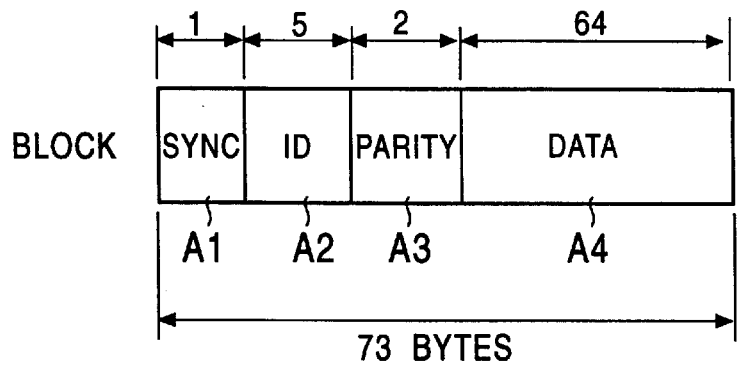
FIGS. 5A, 5B, and 5C are illustrations of a magnetic-tape track structure of the tape cassette shown in FIG. 2.
Figure 5B:
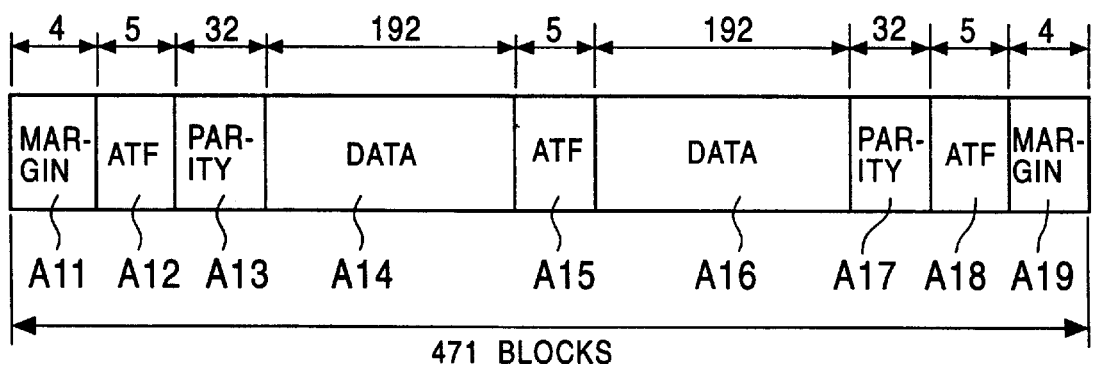

In addition, the structure of data in one track in (d) the frame, is shown in FIGS. 5A and 5B.

In FIG. 5A, the structure of block unit data is shown. One block is formed by a 1-byte SYNC data area A1, a subsequent 6-byte ID area A2 for search, etc., an error-correcting parity area A3 comprised of 2 bytes, and a 64-byte data area A4.

The one-track data shown in FIG. 5B is formed by a total of 471 blocks. In one track, 4-block margin areas A11 and A19 are provided at its ends, and ATF areas A12 and A18 for tracking control are provided after the margin area A11 and before the margin A19. After the AFT area A12 and before the ATF area A18, parity areas A13 and A17 are provided. A 32-block region is assigned to the parity area A13 or A17.

In addition, an ATF area A15 is provided in the center of one track, and a 5-block region is assigned to each of the AFT areas A13, A15, and A18. Between the parity area A13 and the ATF area A15, and between the ATF area A15 and the parity area A17, 192-block data areas are respectively provided. Hence, all the data areas (A14 and A16) in one track occupy 192×2=384 blocks among all the 471 blocks.

Figure 5C:
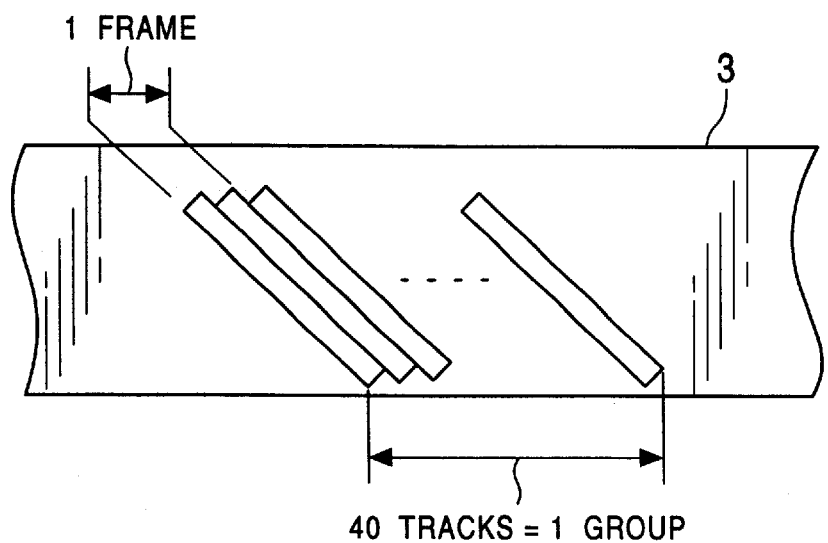

The tracks are physically recorded on the magnetic tape 3, as shown in FIG. 5C, 40 tracks (=20 frames) constitute 1 group, as described above.

Figure 6:
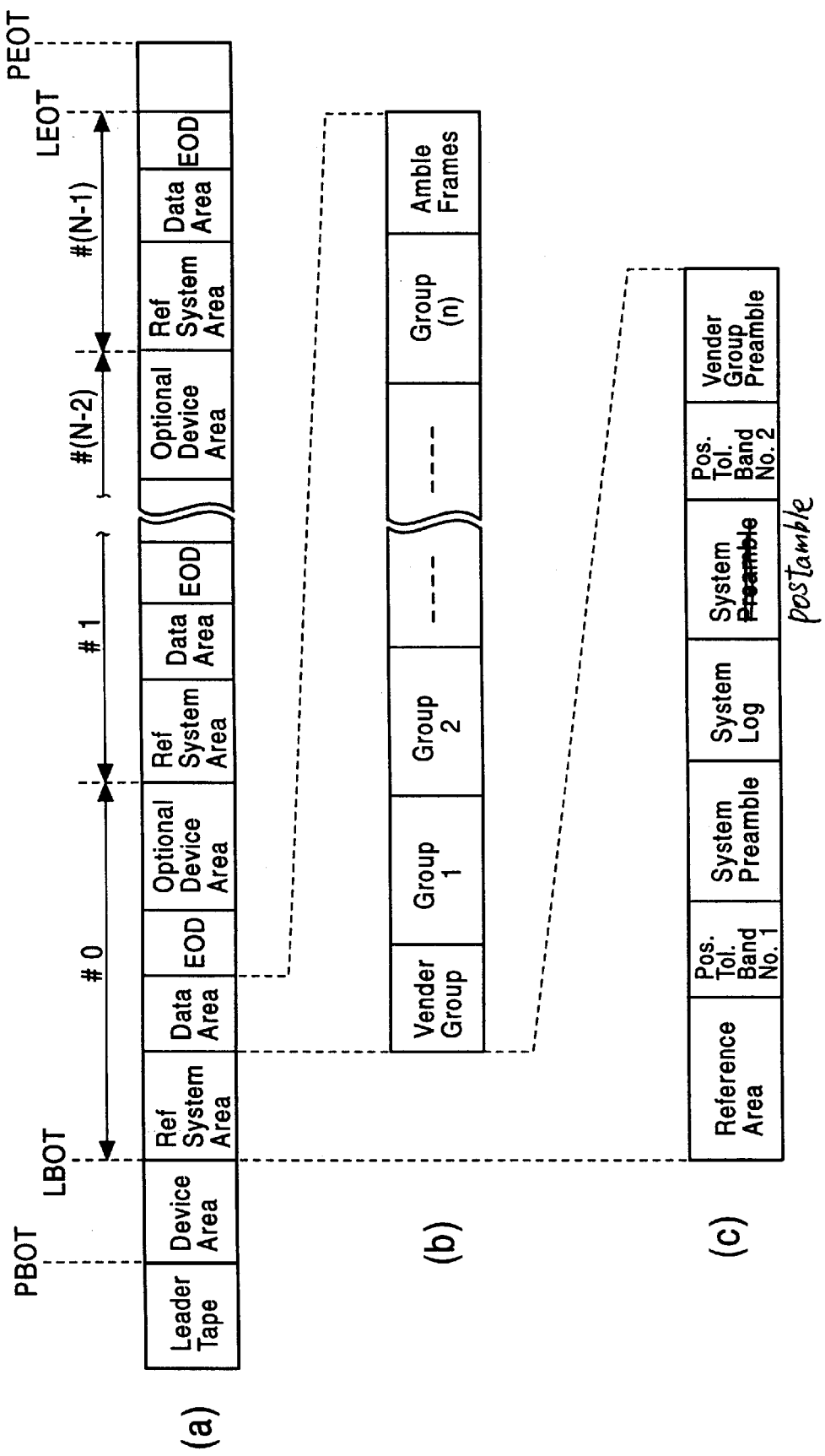
FIG. 6 is a drawing showing a magnetic-tape area structure of the tape cassette shown in FIG. 2.

The area structure shown in FIG. 6 is used to record data on the magnetic tape 3 described using FIGS. 4 and 5A to 5C.

Here, a case where N partitions from #0 to #N−1 are formed is described.

A leader tape is physically positioned at the start of the magnetic tape 3 (illustration (a)), and a device area that is a region for performing tape-cassette loading/unloading is subsequently provided. The start of the device area is used as a physical tape's PBOT (physical Beginning of Tape).

Subsequently to the device area, a reference area relating to partition #0, and a system area (hereinafter referred to as a "system area" including the reference area) in which tape-use-record information, etc., are stored, are provided, and a data area is subsequently performed.

The start of the system area is used as a logical tape's LBOT (logical beginning of tape).

In the system area, a reference area, a position tolerance band No. 1, a system preamble, a system log, a system postamble, a position tolerance band No. 2, and a vendor group preamble are formed, as shown as an enlarged view as illustration (c).

In the data area subsequent to the system area, a vendor group representing information on a vendor to which data are initially created and supplied is provided, as shown as an enlarged view as illustration (b). Subsequently, a plurality of sequential groups as the group shown in FIG. 4(c) are formed, as indicated by group 1 to group (n). An amble frame is provided after the end group (n).

Subsequently to the data area, an EOD (end of data) region representing the end of the data area in a partition is provided (in illustration (a)).

When only one partition is formed, the end of the EOD of the partition #0 is used as a logical tape's LEOT (logical end of tape). However, in the described case, N partitions are formed. Accordingly, an optional device area is formed subsequently to the EOD of partition #0.

The device area from the start position PBOT is an area for performing loading/unloading corresponding to partition #0, and the last optional device area of partition #0 is an area for performing loading/unloading corresponding to partition #1.

Concerning partition #1, area are formed similarly to partition #0, and at its end, an optional device area is formed that is an area for performing loading/unloading corresponding to next partition #2.

Thereafter, partitions up to #(N−1) are similarly formed.

In the last partition #(N−1), an optional device area is not formed since it is not necessary, and the end of the EOD of partition #(N−1) is used as a logical tape's end position LEOT (logical end of tape).

A PEOT (physical end of tape) represents a physical tape's end position or a physical partition's end position.

4. Structure of Data in MIC

Next, the structure of data in the MIC 4 included in the tape cassette 1 is described below.

Figure 7:
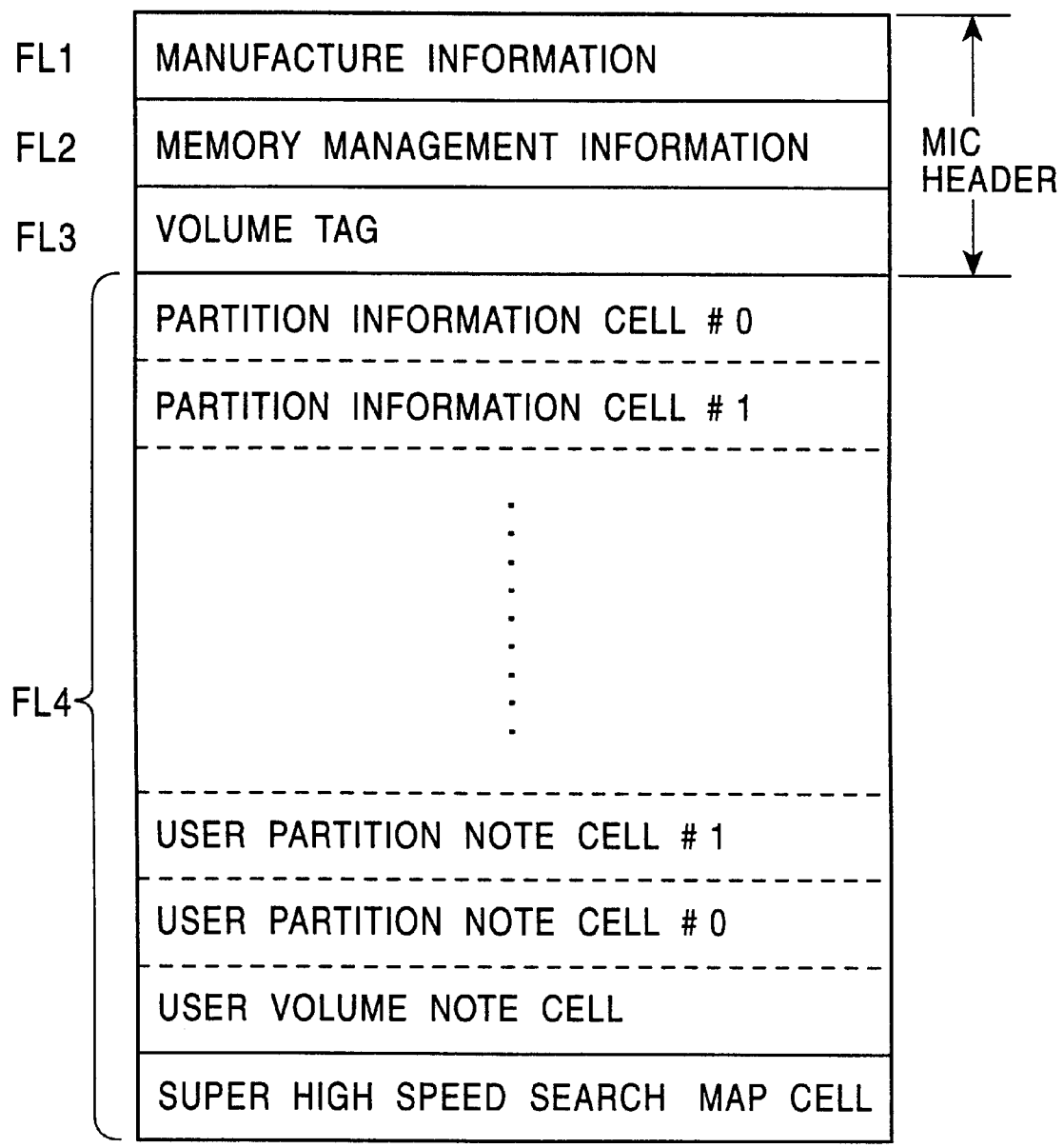
FIG. 7 is an illustration of the structure of data in an MIC according to an embodiment of the present invention.
Figure 8:
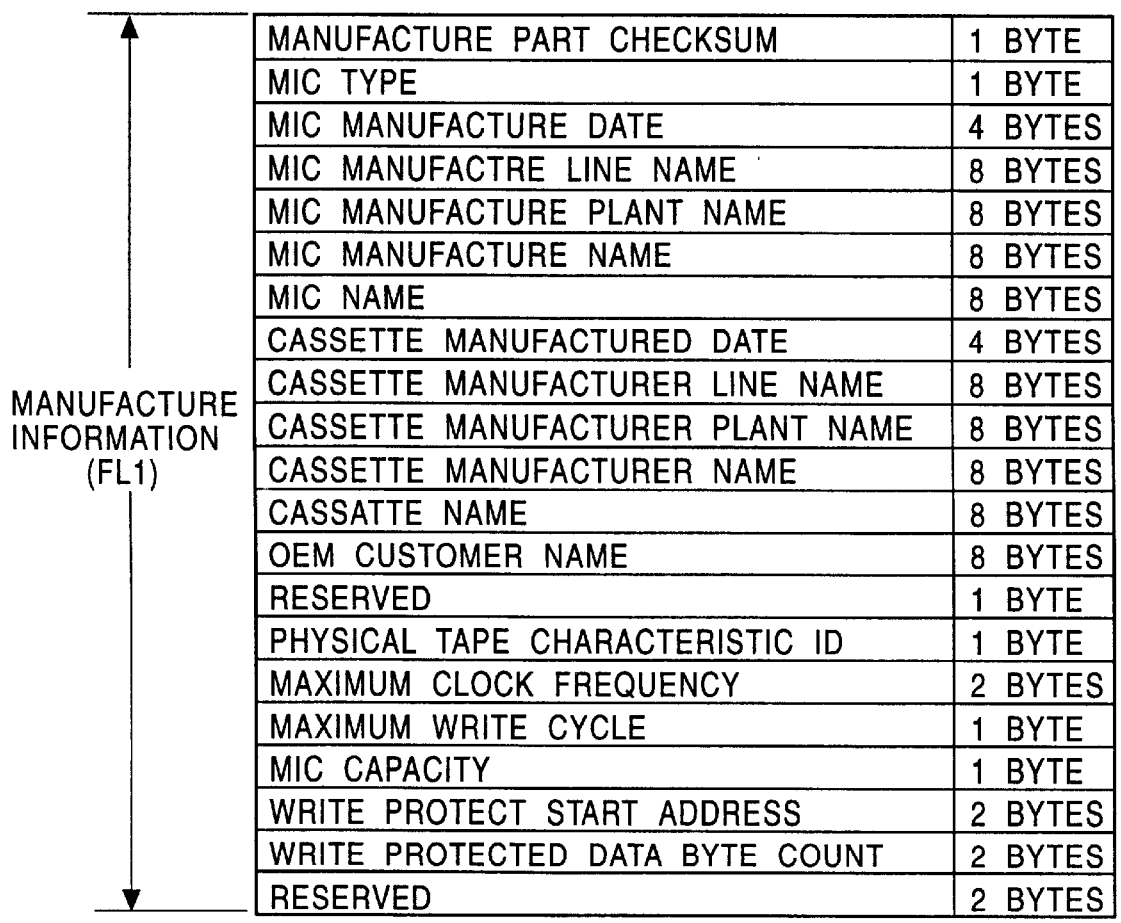
FIG. 8 is an illustration of manufacture information in the MIC shown in FIG. 7.

FIG. 7 is a schematic illustration showing an example of the structure of data stored in the MIC 4. Fields FL1 to FL4 are set as storage areas in the MIC 4, as shown in the FIG. 7.

In these fields FL1 to FL4, various types of information obtained when the tape cassette was manufactured, tape information at the time of initialization, information of each partition, etc., are written.

Field FL1 is called "manufacture information" and is used as a manufacture part for mainly storing various types of information obtained when the tape cassette was manufactured.

Field FL2 is called "memory management information" and is used as a drive-initialize-part for mainly storing information at the time of initialization, etc.

Field FL3 is called "volume tag" for storing basic management information of the entire tape cassette.

Field 4 is used as the area of a memory free pool, and is formed as an area in which management information can be additionally stored. In this memory free pool, various types of information are stored in accordance with the process of the writing/reading operation or as required. One unit of a data group stored in the memory free pool is called a "cell".

In accordance with partitions formed on the magnetic tape 3, partition information cells #0, #1, . . . to be used as management information corresponding to each partition are sequentially written from the head of the memory free pool. In other words, the partition information cells are formed as an equal number of cells to the number of partitions formed on the magnetic tape 3.

In addition, from the end side of the memory free pool, a super high speed search map cell as map information for high speed search is written.

Successively from the end side, a user volume note cell and user partition note cells are written. The user volume note cell is information such as a user-input comment on the entire tape cassette, and the user partition note cells are information such as user-input comments on the respective partitions. Accordingly, these are stored when the user instructs writing, so that the information is not always described.

An intermediate area in which the information is not stored is left as a memory free pool for subsequent writing.

The manufacture information in Field FL1 has a structure as shown in, for example, FIG. 5. The sizes (the number of bytes) of data are shown on the right.

In the first one byte of the manufacture information, information of a checksum for the data of the manufacture information is stored as a manufacture part checksum. The manufacture part checksum is supplied at the time of tape cassette manufacturing.

In addition, an MIC type to a write protected data byte count are described as actual data constituting the manufacture part. Each "reserved" indicates an area reserved for data storage of the future. This applies to also the following description.

The MIC type is data representing the type of an MIC that is actually included in the tape cassette.

An MIC manufacture date represents the manufacturing date (and time) of the MIC.

An MIC manufacture line name represents information of a line that manufactured the MIC.

An MIC manufacture plant name represents information of the name of a plant that manufactured the MIC.

An MIC manufacturer name represents information of the name of a manufacturer that manufactured the MIC.

An MIC name represents information of an MIC vendor.

In addition, in a cassette manufacture date, a cassette manufacture line name, a cassette manufacture plant name, a cassette manufacture name, and a cassette name, information on the cassette itself, which is similar to the information on the MIC, is described.

As an OEM customer name, information of the name of an OEM customer is stored.

A physical tape characteristic ID represents information of physical characteristics of the magnetic tape, such as tape material, tape thickness, and tape length.

As a maximum clock frequency, information representing a maximum clock frequency corresponding to the MIC is stored.

A maximum write cycle represents data-length-unit information, as an MIC characteristic, on, e.g., how many bytes of data can be transferred by performing communication at a time with the tape streaming drive 10. This information is dependent on the physical characteristics of the nonvolatile memory used as the MIC.

An MIC capacity represents information of the storage capacity of the MIC.

A write protect start address is used to inhibit writing in a predetermined area of the MIC, and represents the start address of the writing-inhibited area.

A write protected data byte count represents the number of bytes of the writing-inhibited area. In other words, an area, occupied for the number of bytes represented in the write protected data byte count from the address designated in the write protect start address, is set as the writing-inhibited area.

Figure 9:
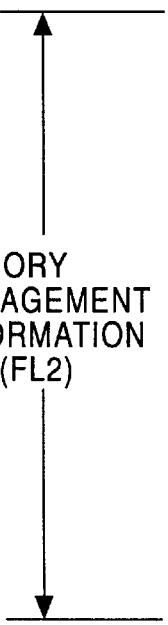
FIG. 9 is an illustration of memory management information in the MIC shown in FIG. 7.
Figure 10:
FIG. 10 is an illustration of a volume attribute flag in the MIC shown in FIG. 7.

Next, the structure of the memory management information in Field FL2 is described using FIG. 9. The sizes (the numbers of bytes) of the data are shown on the right.

In the memory management information, information of a checksum of data in the memory management information, which is used as a drive initialize part, is initially stored as a drive initialize part checksum.

Subsequently, as actual data constituting the memory management information, information from an MIC logical format type to a free pool bottom address is described.

At first, the ID number of the logical format of the MIC is stored as an MIC logical format type. MIC formats include, excluding a basic MIC format, various types of formats related to a firmware updating tape MIC format, a reference tape MIC format, a cleaning cassette MIC format, etc. The ID number in accordance with the MIC format of the tape cassette is represented.

In an absolute volume map pointer, a pointer representing the start address of the super high speed search map cell shown in FIG. 7 is set.

A user volume note cell pointer represents the start address of a storage area enabling the user to freely perform reading/writing from/to the tape cassette via the SCSI interface, that is, the user volume note cell shown in FIG. 7.

A user partition note cell pointer represents the start address of a storage area enabling the user to freely perform reading/writing data from/to each partition via the SCSI interface, that is, the user partition note cell shown in FIG. 7. In the case where a plurality of user partition note cells may be stored, the user partition note cell pointer represents the start address of a start cell among the user partition note cells.

A partition information cell pointer represents the start address of the partition information cell #0 shown in FIG. 7.

The number of pieces of partition information written in the memory free pool are formed so as to correspond to the number of partitions formed on the magnetic tape 3. All partition information cells #0 to #N are linked by pointers in a link structure. In other words, the partition information cell pointer is used as a root representing the address of partition #0, and the pointers of the subsequent partition information cells are set in the adjacent partition information cells.

As described above, the data positions in field FL4 are managed by the pointers (the absolute volume map pointer, the user volume note cell pointer, the user partition note cell pointer, and the partition information cell pointer).

A volume attribute flag is a 1-byte flag for providing the MIC 4 with a logical writing-inhibiting flag.

A free pool top address and a free pool bottom address represent the start address and end address of the memory free pool at the point of time in field FL2. Since the area as the memory free pool changes in accordance with the writing or erasure of the partition information or the user partition note, etc., the free pool top address or the free pool bottom address is accordingly updated.

In one byte as the volume attribute flag, flag contents for the respective bits are defined as follows:

In other words, flags representing writing-permission/inhibition, reading-permission/inhibition, data-rewriting-permission/inhibition based on RAW in the writing mode, and data-reading-retry-permission/inhibition in the reading mode are prepared as "Prevent Write", "Prevent Read", "Prevent Write Retry", and "Prevent Read Retry".

In addition, a flag that is set when magnetic-tape writing, erasure, and initialization are performed and that is reset in accordance with the termination of the operations is prepared as volume open close. This flag is hereinafter referred to as "Volume O/C Flag".

Subsequently, the structure of the volume tag in field FL3 in FIG. 7 is described using FIG. 11. The sizes (the numbers of bytes) of data are shown on the right.

At the start of the volume tag, information of a checksum of the data of volume information, which stores basic management information on the entire tape cassette, is stored as a volume information checksum.

Volume information is subsequently described.

Information on a checksum of the data of an accumulative partition information, which stores record information from the time the tape cassette was manufactured, is stored as an accumulative partition information checksum.

Subsequent to the volume note checksum and the volume note, for example, a serial number that is 32-character information based on the ASCII is stored as a cartridge serial number.

As a manufacture ID, the code number of the manufacturer of the tape cassette 1, which is a manufacture identifier, is stored.

A secondary ID is a secondary identifier in accordance with the type of the tape cassette 1, and, for example, tape attribute information that is a 1-byte code value is stored.

A cartridge serial number part is used as checksum information for the cartridge serial number, a manufacture ID, and a secondary ID.

Specific volume tags 1 to 13 are used as, for example, a reserve, and each area is comprised of, e.g., 36 bytes.

Subsequently, cells stored in the field FL4 shown in FIG. 4 are described.

Field FL4 is used as a region for the memory free pool, in which partition information cells, user partition note cells, etc., are sequentially stored. Cells (e.g., partition information cells #1 to #N) of the same type are linked by link information described next.

Figure 12:
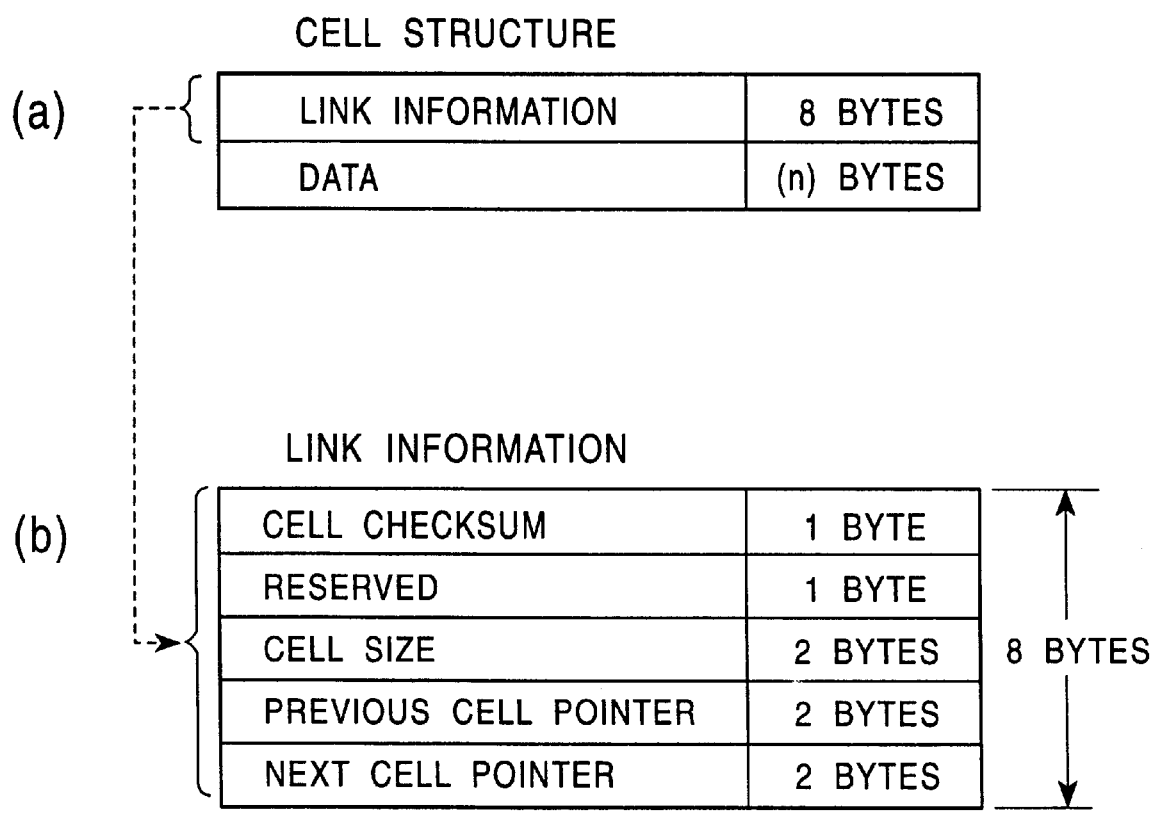
FIG. 12 is a drawing showing the cell structure of the MIC shown in FIG. 7.

The structure of each cell is shown in FIG. 12.

One cell (illustration (a)) is formed by link information having 8 types and data having n bytes (differing depending on the cell type).

The 8-byte link information is provided in each cell, and has a structure indicated by illustration (b).

As a checksum on the data in the cell, a 1-byte cell checksum is firstly provided.

As a 2-byte cell size, the size of the cell is shown.

A previous cell pointer and a next cell pointer are actual linkage data (data constituting the link structure). When a plurality of cells of the same type are linked, the previous cell pointer and the next cell pointer designate the adjacent two cells.

As a cell having such a structure, there are a partition information cell, super high speed search cell, a user volume note cell, and a user partition note cell. The partition information cell has a fixed cell size. The other cells have variable cell sizes.

The partition information cell having a fixed cell size is described using FIG. 13.

The partition information cell is formed by 8-byte link information and 56-byte data (in the partition information cell the data ((n) bytes) shown in FIG. 12 is 56 bytes), as shown in FIG. 12.

Among the 56-byte data, 8 bytes are used as a partition memo, and 48 bytes are used as partition information.

In the partition information (system log), various types of information concerning a magnetic-tape-use record in the partition corresponding to the cell are stored, and are used as information used in order for the tape streaming drive to manage its writing/reading operation.

The data structure of partition information in one partition information cell corresponding to a certain cell is defined as shown in FIG. 13.

The 4-byte "Previous Groups Written" represents information on the number of groups (in the partition) physically recorded on the magnetic tape since the time that the partition information was last updated.

The 4-byte "Total Groups Written" represents the total number of groups having been recorded in the partition. This value accumulates until, for example, the tape cassette is out of condition due to the expiration of its life, or is discarded.

If data are being recorded on the magnetic tape 3 by the tape streaming drive, the system controller 15 of the tape streaming drive performs processing, whereby in the "Previous Groups Written" and the "Total Groups Written", their values are incremented in accordance with the number of groups newly recorded by the present writing operation.

The 3-byte "Previous Groups Read" represents the number of groups physically read since the time that the partition information was last updated.

The 4-byte "Total Groups Read" represents a value obtained by accumulating numbers of groups having been read.

The 3-byte "Total Rewritten Frames" represents a value obtained by accumulating numbers of frames in which data rewriting was requested based on READ-AFTER-WRITE (hereinafter abbreviated as "RAW") in the partition.

The tape streaming drive according to this embodiment performs, as the RAW operation, the reading of data of a frame written on the magnetic tape 3 just after the writing, by using, for example, the reproducing head 13C. Error detection on the frame data read by the RAW is performed by the system controller 15. If a generated error is detected, the writing system is controlled to rewrite data of the frame in which the error was generated. A value obtained by accumulating numbers of frames in which data rewriting was performed in the above-described case is set as the "Total Rewritten Frames".

The 3-byte "Total 3rd ECC Count" represents a value obtained by accumulating numbers of groups in which error correction was performed using the C3 parity in the partition.

In the tape streaming drive according to this embodiment, the data read from the magnetic tape 3 are error-corrected. The C3 parity is used when data cannot be restored using only C1 and C2 parities.

The 4-byte "Access Count" represents the number of times in which the tape streaming drive accessed the partition. The word "accessed" means the number of times in which the tape streaming drive physically passed the partition. This is, it includes the number of times in which writing to or reading from the partition was performed and the number of times in which the tape streaming drive passed the partition.

The 4-byte "Update Replace Count" represents information obtained by accumulating the number of times in which updating rewrote data on the magnetic tape in the partition. That is, the information is the number of times of updating in the partition.

The 2-byte "Previous Rewritten Frames" represents information on the number of frames in which data rewriting was requested in connection with the above-described RAW since the time that the information of the partition was last updated.

The 2-byte "Previous 3rd ECC Count" represents the number of groups in which error correction using the C3 parity was performed since the time that the information of the partition was last updated.

The 3-byte "Load Count" represents a value obtained by accumulating the numbers of times in which the tape was loaded.

The 3-byte "Valid Maximum Absolute Frame Number" represents information on a frame count up to the last frame regarded as valid in the partition.

Differently therefrom, the "Maximum Absolute Frame Number", in the last three bytes of the partition information, represents information on the last frame count of the partition.

In 1-byte flag bytes, a flag content for each bit is defined as follows:

Specifically, flags representing writing-permission/inhibition and reading-permission/inhibition in the partition, data-rewriting-permission/inhibition based on RAW in the writing mode, and data-reading-retry-permission/inhibition in the reading mode, are prepared as "Prevent Write", "Prevent Read", "Prevent Write Retry", and "Prevent Read Retry".

In addition, a flag that is set when writing to the partition is performed and that is reset in accordance with the termination of the operation is prepared as "Partition Open Close". This flag is hereinafter referred to as "Partition O/C Flag" so as to be differentiated from the Volume O/C Flag.

Although the structure of data in the MIC 4 is as described using FIGS. 7 to 13, the above-described structure of data in the MIC 4 is nothing but one embodiment, and the arrangement of data, area setting, data sizes, etc., are not limited to those described.

5. Processing in Operations Such as Writing

Processing in operations by the tape streaming drive 10, such as writing to the tape cassette 1, is described below. One of features in this embodiment is that the setting/resetting of the Partition O/C Flag and the Volume O/C Flag is performed.

In other words, in the case where the continuation of operation is disabled in writing, erasing, initialization, and particularly in the middle of operation due to a power cut or the like, as to operation in which data on the magnetic tape remain in abnormal condition, the Partition O/C Flag and the Volume O/C Flag are set in the period of the operation.

In FIGS. 14A, 14B, 14C and 14D, schematic setting timing on the Partition O/C Flag and the Volume O/C Flag in the writing operation is shown.

The tape streaming drive 10 records (FIG. 14C), in accordance with a write command from the host computer 40, as shown in FIG. 14A, write data transmitted as shown in FIG. 14B on the magnetic tape 3 (in a designated partition on the magnetic tape). At this time, before executing a writing operation, the system controller 15 of the tape streaming drive 10 controls the Partition O/C Flag and the Volume O/C Flag in the MIC 4 to be set. Specifically, data "1" are written as the Partition O/C Flag and the Volume O/C Flag in the MIC 4.

In addition, at completion of data writing to the magnetic tape 3, the system controller 15 controls the Partition O/C Flag and the Volume O/C Flag in the MIC 4 to be reset. Specifically, data "0" are written as the Partition O/C Flag and the Volume O/C Flag in the MIC 4.

Thereby, as shown in FIG. 14D, in the period of the writing operation to the magnetic tape 3, as the Partition O/C Flag and the Volume O/C Flag are "1". That is, the Partition O/C Flag and the Volume O/C Flag are flags representing the period of the writing operation.

In other words, if the writing operation is stopped in the period of the writing operation in FIG. 14C, due to an interruption of power supply, the Partition O/C Flag and the Volume O/C Flag remain not being reset. Accordingly, the Partition O/C Flag and the Volume O/C Flag in the MIC 4 remain being "1". Therefore, that the Partition O/C Flag and the Volume O/C Flag are "1" in cases where the tape cassette 1 is loaded and where writing to the magnetic tape 3 is executed indicates abnormal condition.

In other words, from the Partition O/C Flag and the Volume O/C Flag, it is found that data on the magnetic tape have been in abnormal condition caused by a power cut in the past.

Processes including the above-described flag-related processing (by the system controller 15 in performing various operations) are described with reference to FIGS. 15 to 18. At first, normal operation condition is described using each of FIGS. 15 to 18, and abnormal condition due to a power cut is subsequently described.

Figure 15:
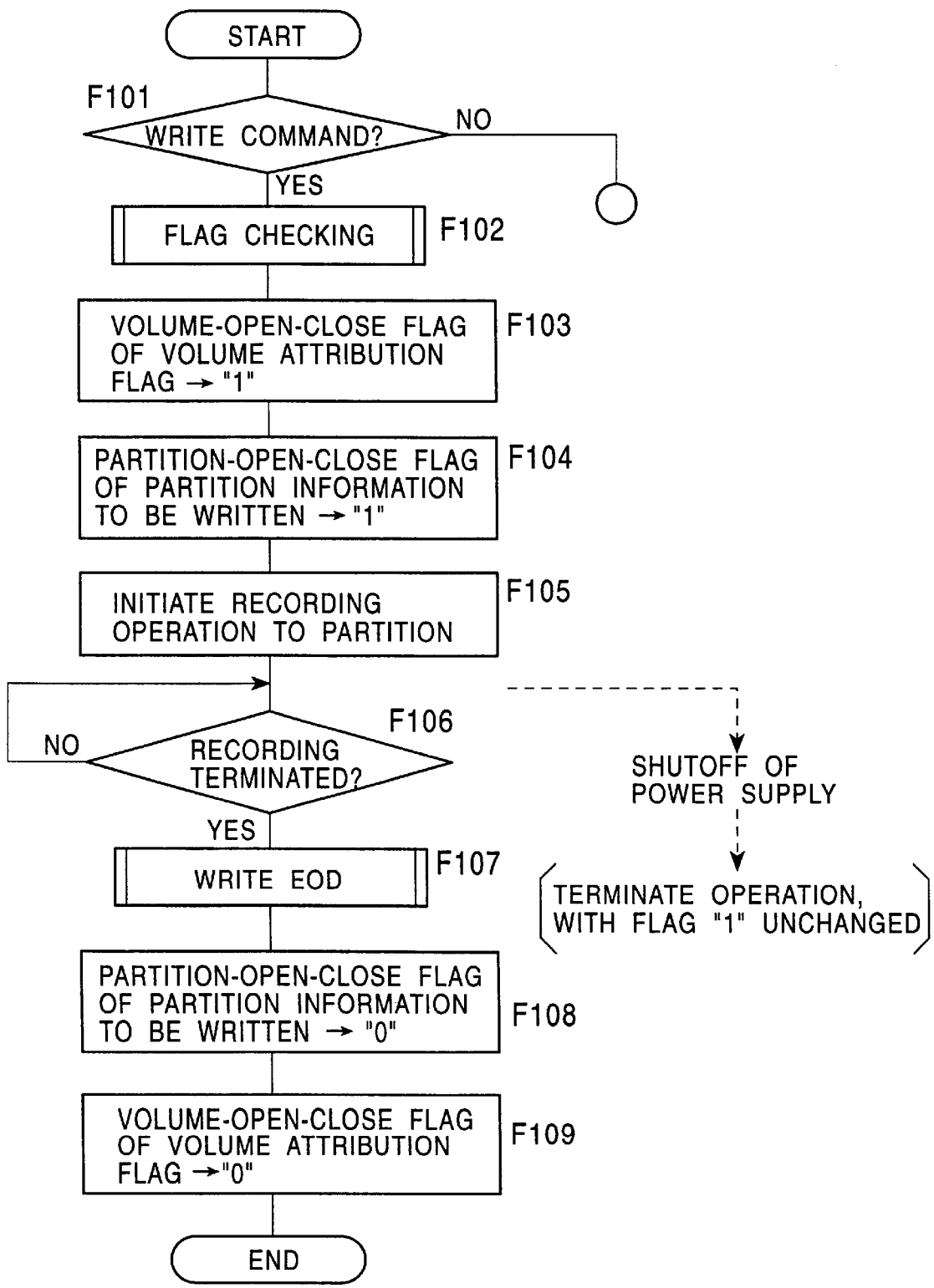
FIG. 15 is a flowchart of a process in data writing mode by the tape streaming drive shown in FIG. 1.

FIG. 15 shows a process performed when data writing to the magnetic tape 3 in the loaded tape cassette 1.

Figure 16:
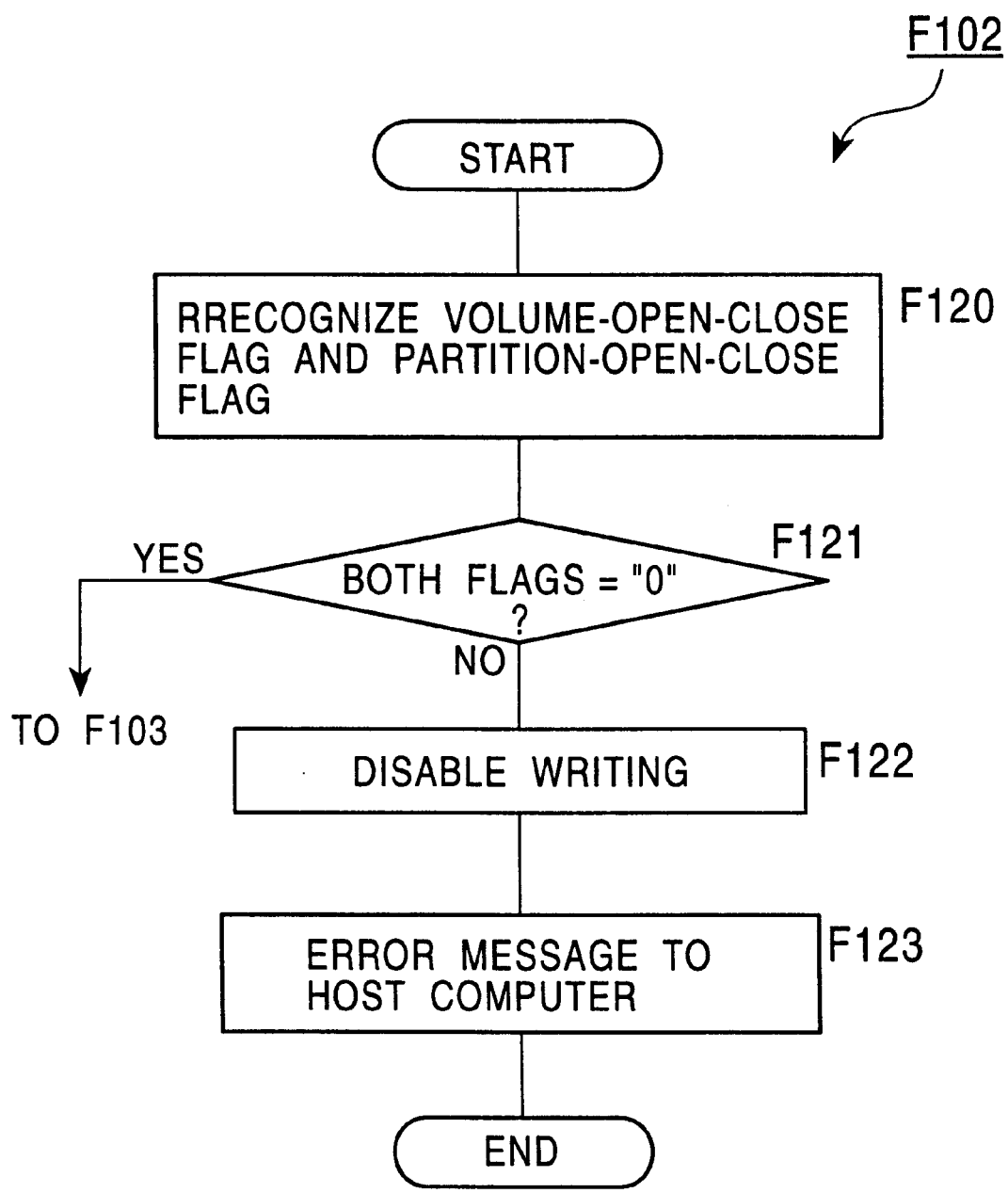
FIG. 16 is a flowchart of a flag checking process by the tape streaming drive shown in FIG. 1.

When receiving a write command from the host computer 40, the system controller 15 proceeds with the process from step F101 to F102, and performs flag checking before initiating the writing operation. In other words, the system controller 15 confirms whether the Partition O/C Flag and the Volume O/C Flag are "0". Processing in step F102 is shown in FIG. 16. At first, in step F120, the Partition O/C Flag and the Volume O/C Flag, stored in the MIC 4, are read (otherwise, if current data are stored in an SRAM 24 or the like, the data may be confirmed).

If both Flags are "0", that is, they are reset, normal condition is confirmed, and the process proceeds from step F121 to the step F103 in FIG. 15.

In step F103, the Volume O/C Flag is set as a preparation for the writing operation. In other words, data in which the Volume O/C Flag="1" is written in the MIC 4. In step F104, the Partition O/C Flag in partition information on a partition in which writing is executed this time is set (Volume O/C Flag="1").

When completing the setting of the Volume O/C Flag and the Partition O/C Flag, the actual writing operation from step F105, that is, data writing to a predetermined partition in accordance with the write command from the host computer 40, is initiated.

After the data writing is initiated, termination of the writing is awaited in step F106, and when the writing is terminated, an EOD is written in the remaining region of the partition in step F107 (see FIG. 6). When the writing of the EOD is finished, the Volume O/C Flag and the Partition O/C Flag in the MIC 4 are reset in steps F108 and F109, and the consecutive writing operation is terminated.

The above-described operation is a process for the operation schematically shown in FIG. 14.

The flag processing is also performed when initialization and the erasing operation are performed.

Figure 17:
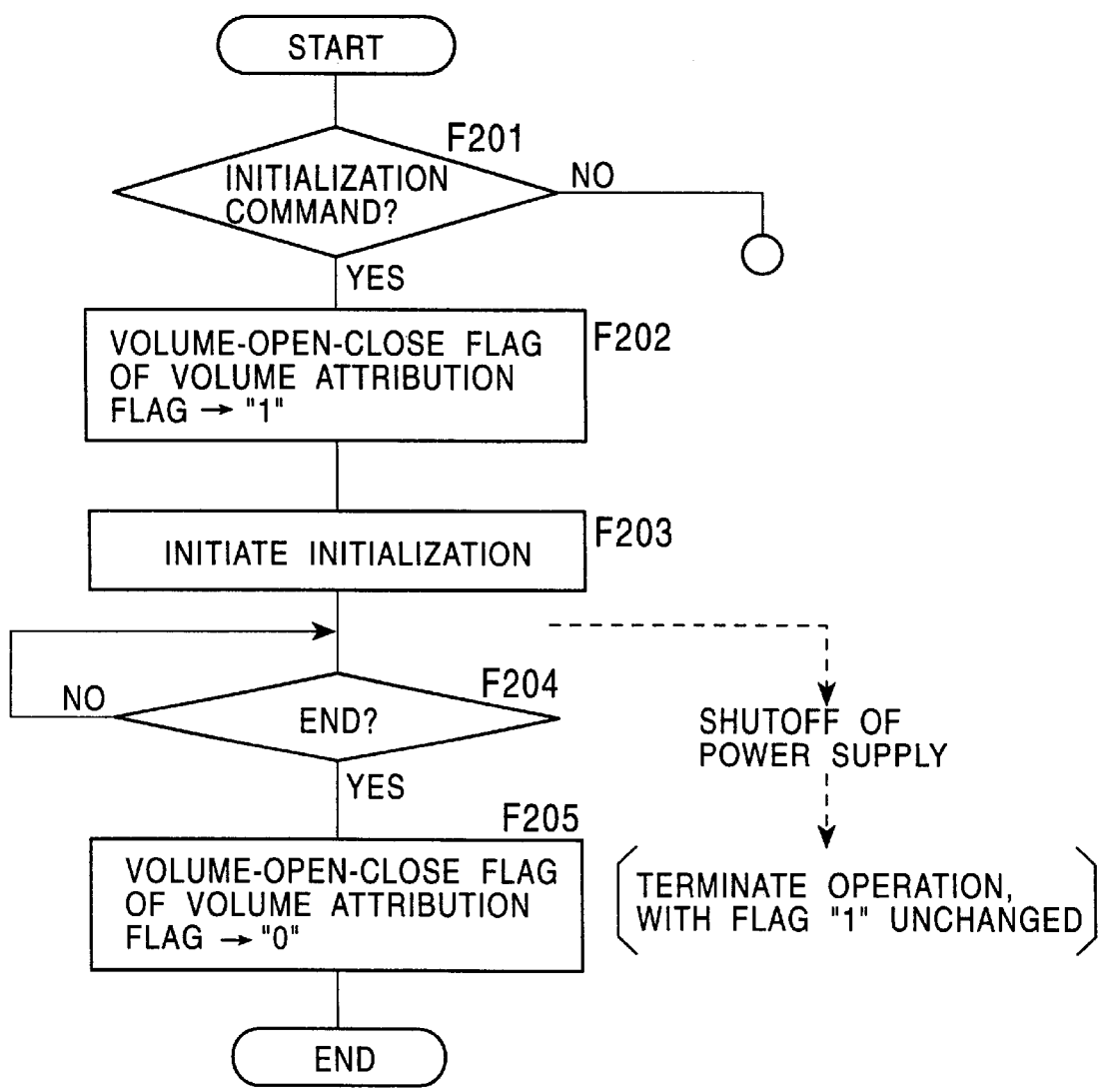
FIG. 17 is a flowchart of a process in initialization or erasing mode by the tape streaming drive shown in FIG. 1.

In FIG. 17, a process in the initialization is shown.

When being supplied with a command for initializing the magnetic tape 3 from the host computer 40, the system controller 15 proceeds with the process from step F201 to F202, and sets the Volume O/C Flag in the MIC 4.

After setting the Volume O/C Flag from step F203, the actual initializing operation, that is, the magnetic tape initialization (partition setting) in accordance with the initialization command from the host computer 40, is initiated.

After that, at completion of the initialization processing, the process proceeds from step F204 to F205 in which the Volume O/C Flag in the MIC 4 is reset, and the initializing operation is terminated.

Concerning the erasure of all actual data on a certain magnetic tape, a process is roughly similar to that in FIG. 17. In other words, a Volume O/C Flag is set before performing the erasure, and a Volume O/C Flag is reset in accordance with completion of the erasure.

In the case where data erasure on only a certain partition is executed, a Volume O/C Flag and a Partition O/C Flag corresponding to the partition may be set before performing the erasure, and both Flags may be reset in accordance with completion of the erasure.

As described above, concerning operations in which data change on the magnetic tape occurs, such as writing, initialization, and erasing, a Volume O/C Flag and a Partition O/C Flag in the MIC 4 are in condition so as to be set in the period of each operation. Excluding the period of each operation, the Volume O/C Flag and the Partition O/C Flag that are reset represent normal condition.

Since a power cut occurs in the writing operation initiated from step F105, and at the time, the operation is stopped, the Volume O/C Flag and the Partition O/C Flag remain being set. Definitely, in this case, data writing (updating) is not completed on the magnetic tape 3. Accordingly, the magnetic tape 3 has inappropriate data condition, for example, old and new data are mixed, and only part of data exists.

In the case where a power cut occurs in the initializing operation initiated from step F203 in FIG. 17, the operation is stopped at the time, and the Volume O/C Flag (or the Volume O/C Flag and the Partition O/C Flag) remains being set. At this time, the initialization or erasing of the magnetic tape 3 is not completed. Accordingly, the magnetic tape 3 has inappropriate data condition, for example, old data remain, and partition setting is not accurately performed, etc.

For coping with these cases, flag checking is performed when the tape cassette 1 is loaded or the writing operation is performed.

Figure 18:
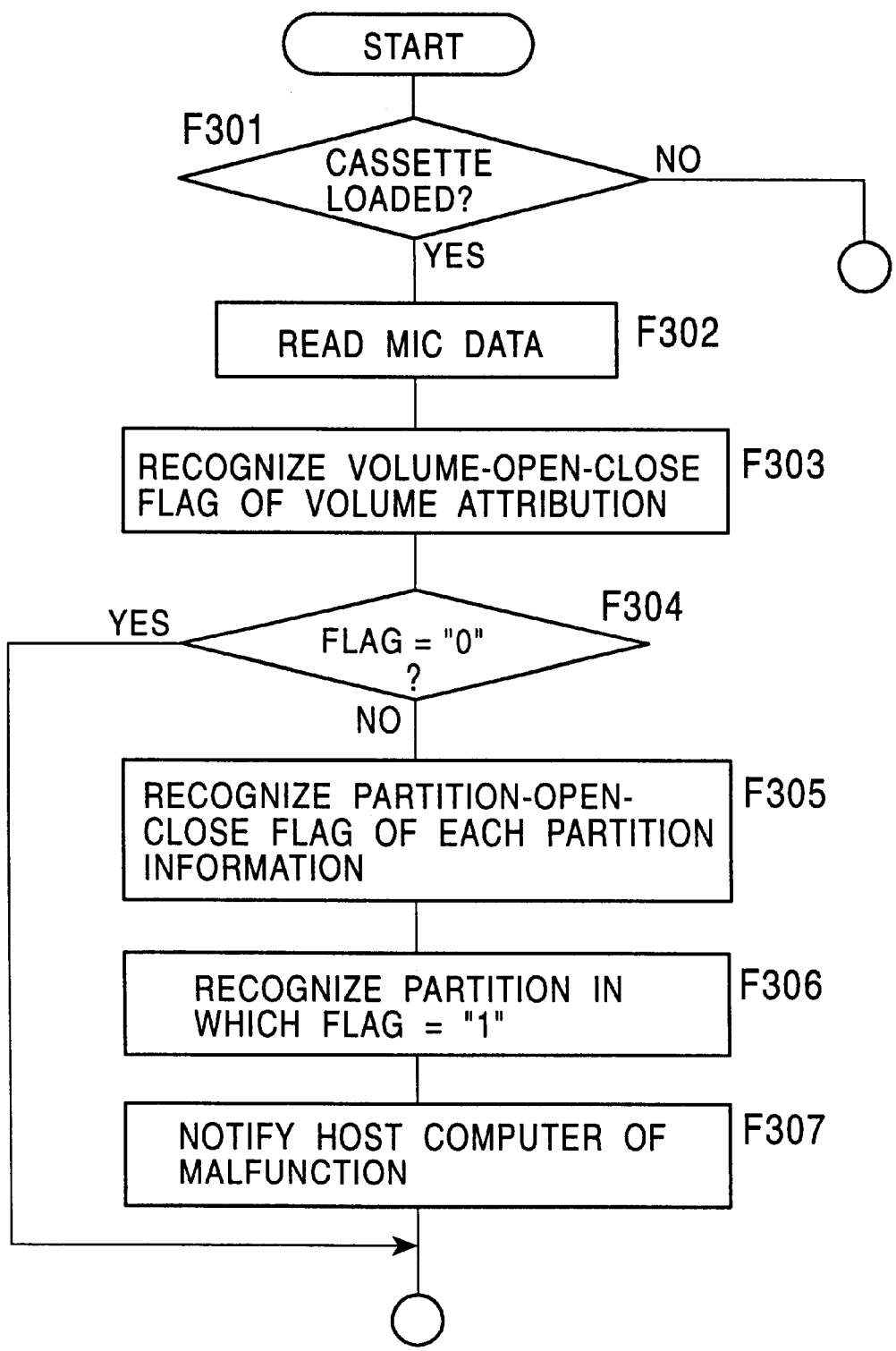
FIG. 18 is a flowchart of a process in cassette loading mode by the tape streaming drive shown in FIG. 1.
Figure 19:
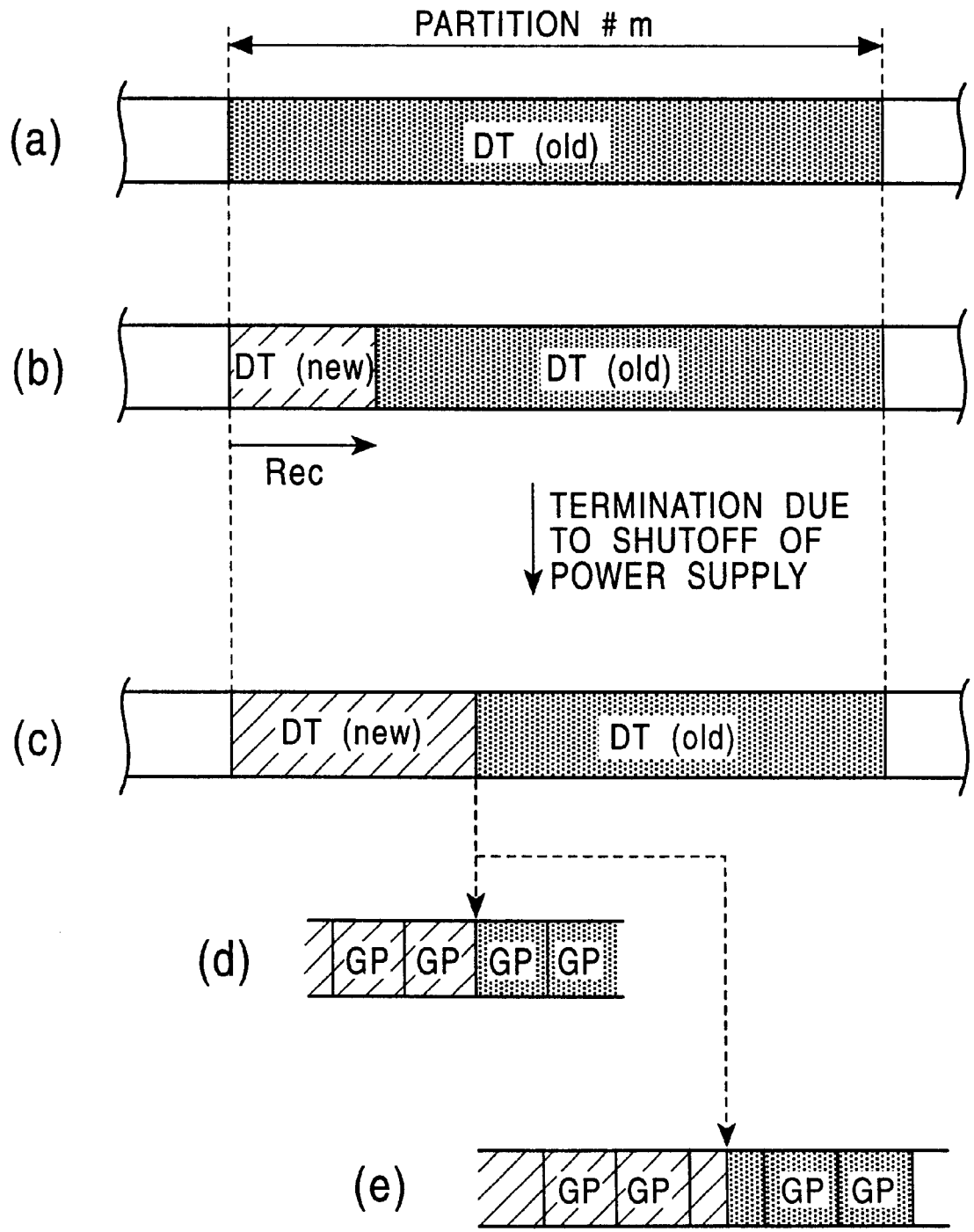
FIG. 19 is a drawing showing abnormal conditions of a magnetic tape due to a power cut.

A process, performed by the system controller 15 when the tape cassette 1 is loaded into the tape streaming drive 10, is shown in FIG. 18.

When the tape cassette 1 is loaded, the process proceeds from step F301 to F302, and the system controller 15 reads management information stored in the MIC 4 of the tape cassette 1. In step F303, in the read management information, a Volume O/C Flag is recognized.

If the Volume O/C Flag is in reset condition, a process from step F304, for the case where the tape cassette is loaded, is normally terminated. After that, the system controller 15 awaits an instruction from the host computer 40.

Conversely, if the Volume O/C Flag is set, it represents that data on the magnetic tape are in abnormal condition due to the power cut. Accordingly, the system controller 15 proceeds with the process to step F305, and checks a Partition O/C Flag in each partition information in the management information. The system controller 15 recognizes a Flag-set partition in step F306, and stores it as an abnormal partition.

In step F307, the system controller 15 notifies the host computer 40 that the presently loaded tape cassette 1 is in abnormal condition. As this notification, a simple notification in which tape malfunctioning occurs or a notification for enabling the specification of an abnormal partition may be used.

The host computer 40 can know abnormal condition on the loaded tape cassette 1, as described above, whereby the host computer 40 can request a user to take an appropriate measure by, for example, giving a message or the like.

By, for example, letting the user know that a data content is in inappropriate condition, if the user requests the reading of magnetic tape data, the user can be aware that the read data are not reliable, which enables careful handling of the data. For example, by reading the magnetic tape data (partitions) as far as possible, the user can take measures such as correction of the read data by the user, and extraction of necessary part.

In addition, it is possible to take a measure such as the execution of rewriting normal data.

Otherwise, by notifying the user of the normal or abnormal condition in units of partitions, only normal partitions can be used after the notification.

Concerning the above-described process for the loading case, by, for example, checking only the Volume O/C Flag, the host computer 40 may be notified of abnormal condition when the Volume O/C Flag is set (the Partition O/C Flag is not checked).

In the case where abnormal condition is detected by checking the Volume O/C Flag, the system controller 15 (or the host computer 40) may set the tape cassette 1 to be in writing-inhibited condition. In the case where abnormal condition is detected in each partition unit, only the partition may set to be in writing-inhibited condition.

Otherwise, in order to prevent abnormal data from being provided, the setting of reading-inhibition is also possible.

The flag checking is also performed not only in the above-described loading case but also in the writing operation mode shown as step F102 in FIG. 15 described above.

Specifically, when the flag checking shown in FIG. 16 is performed before initiating writing, and the flag setting is recognized in step F121, the system controller 15 performs writing-inhibition setting in step F122 so that the writing operation (the writing operation instructed by the write command in step F101) to be presently executed cannot be executed, and messages an error to the host computer 123. In other words, notification of error on the fact that the writing operation based on the write command was not executed is performed and notification of abnormal condition on the partition is performed.

By performing notification, as described above, the above-described appropriate measures can be taken at the host computer 40 (the user end), even at the time of initiating the writing.

Since magnetic tape abnormal condition can be detected by the flag checking in the loading mode and the writing mode, as described above, the system controller 15, the host computer 40, and the user can respectively take appropriate measures, which realizes improvement in the reliability of a data storage system.

Although the embodiments of the present invention have been described, the present invention is not limited to the foregoing construction and operations, but the tape cassette, the tape streaming drive, the format of data to be stored in the MIC, and the processes and the operations may be modified in accordance with actual operating conditions, etc. In particular, it is possible that there are many flags and their types, and many types of flags to be recognized in flag checking.

Concerning the foregoing embodiments, an 8-mm VCR tape cassette including a nonvolatile memory, in which digital signals are written/read, and a writing/reading system including a tape streaming drive adapted for the tape cassette, have been described. However, the embodiments are not limited to those described, and the present invention may be applied to a writing/reading system for writing/ reading, as digital signals, the information of video signals and audio signals.

What is claimed is:

1. A tape drive unit adapted for a tape cassette containing a magnetic tape and including a memory for writing management information for managing writing on or reading from said magnetic tape, said tape drive unit comprising:

tape drive means for writing/reading information on/from said magnetic tape of said tape cassette when said tape cassette is loaded thereon;

memory drive means for reading/writing management information on/from said memory of said tape cassette; and control means, wherein when said tape drive means executes an operation of writing or erasing information on said magnetic tape or an operation of initializing said magnetic tape, said control means controls said memory drive means to set flags in said management information written in a header area of said memory for indicating that said operation is being executed, and upon a completion of said operation, said control means controls said memory drive means to reset said flags in said header area, and when said operation is interrupted before said completion of said operation, said control means controls said memory drive means to maintain said flags in said set condition.

2. The tape drive unit according to claim 1, wherein said flags include a first flag and said control means controls said set and reset of said first flag.

3. The tape drive unit according to claim 1, wherein said flags include a second flag for managing each partition on said magnetic tape of said tape cassette, and said control means controls said set and reset of said second flag in accordance with a partition in which said operation is executed.

4. The tape drive unit according to claim 1, wherein when said flags are set for said magnetic tape or a partition on said magnetic tape on which an information writing operation is to be executed, said control means inhibits said information writing operation from being executed.

5. The tape drive unit according to claim 1, wherein when said flags are set for said magnetic tape or a partition on said magnetic tape on which an information writing operation is to be executed, said control means notifies a host unit of an error.

6. A recording medium including:

a magnetic tape, and a memory for writing management information for managing writing to or reading from said magnetic tape, wherein said management information of said memory is included in a header area, and when a tape drive unit executes an operation of writing/ erasing information on said magnetic tape or an initializing operation, a flag indicating that the operation is being executed is set in said header area, and when said operation is completed, said flag is reset, and when said operation is interrupted before said completion of said operation, said flag is maintained in said set condition.

7. The recording medium according to claim 6, wherein said flag is management information for managing the overall magnetic tape.

8. The recording medium according to claim 6, wherein said flag is management information for managing each partition on said magnetic tape.

* * * * *